W. E. WISE.
COMBINATION SLEIGH AND WHEELED VEHICLE.
APPLICATION FILED OCT. 16, 1912.
1,079,201.
Patented Nov. 18, 1913.
2 SHEETS—SHEET 2.
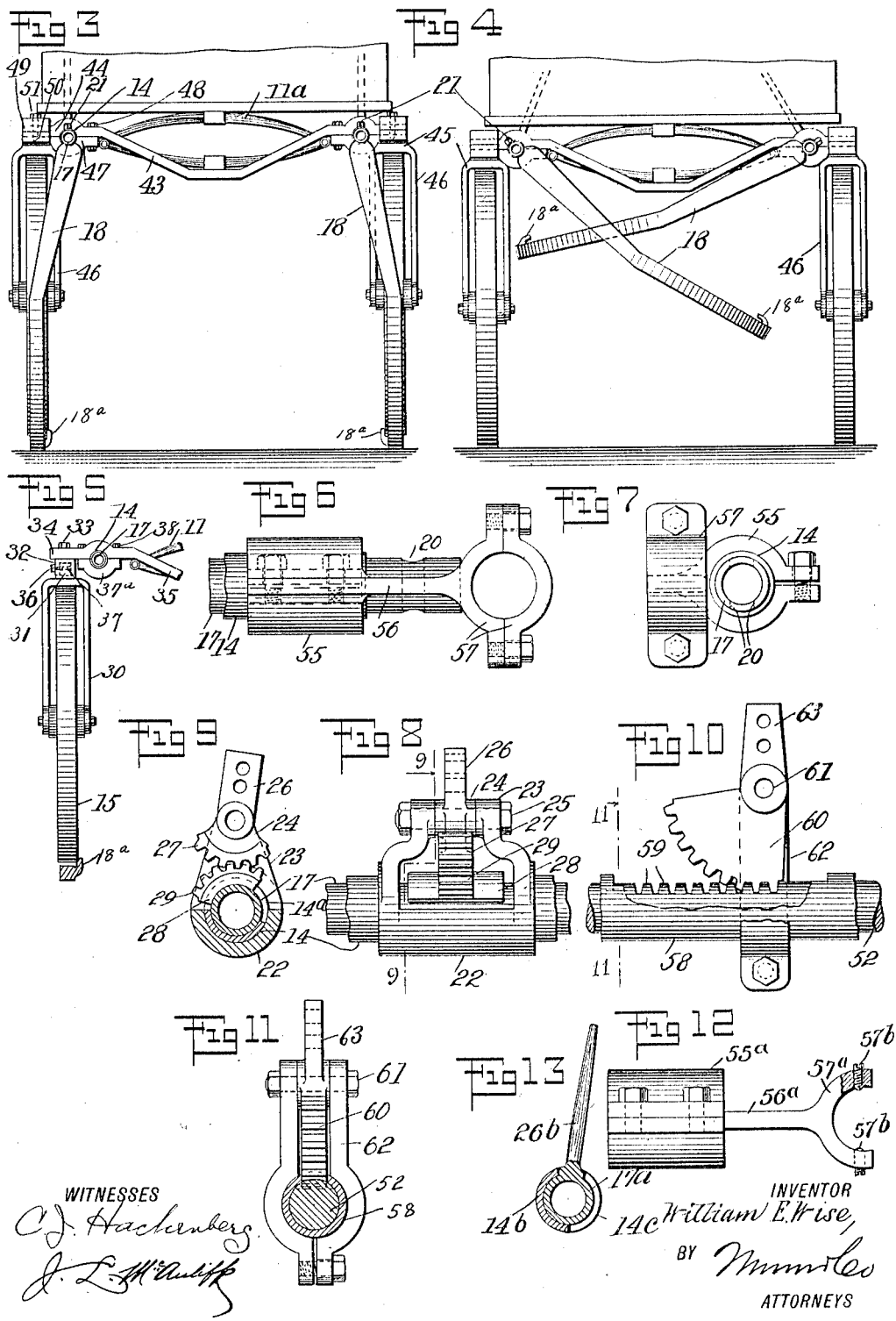

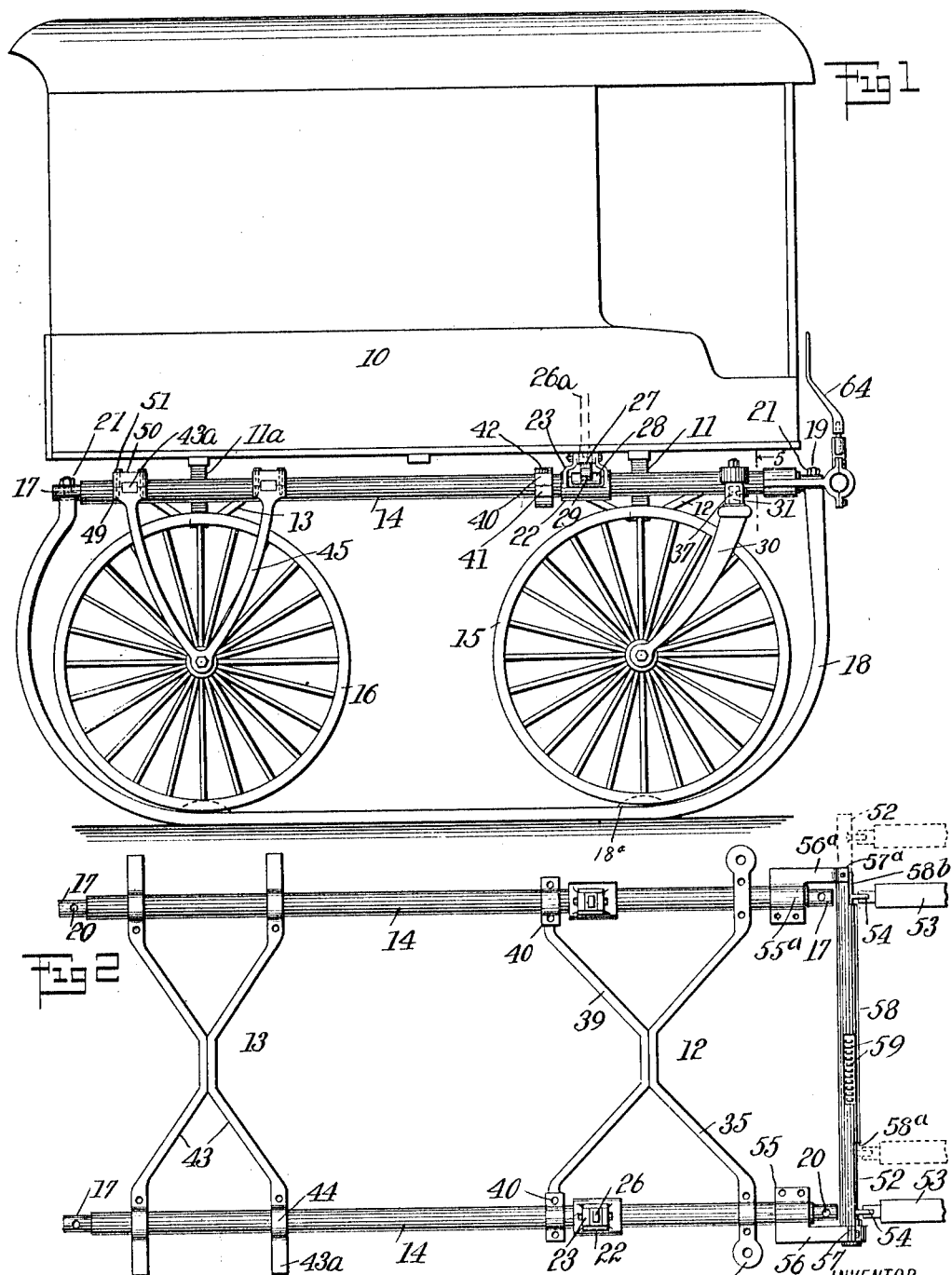

UNITED STATES PATENT OFFICE.

WILLIAM ELLIS WISE, OF WILLIAMSPORT, PENNSYLVANIA.

COMBINATION SLEIGH AND WHEELED VEHICLE.

1,079,201. Specification of Letters Patent. Patented Nov. 18, 1913.

Application filed October 16, 1912. Serial No. 726,061.

*To all whom it may concern:*

Be it known that I, WILLIAM E. WISE, a citizen of the United States, and a resident of Williamsport, in the county of Lycoming and State of Pennsylvania, have invented a new and Improved Combination Sleigh and Wheeled Vehicle, of which the following is a full, clear, and exact description.

An object of my invention is to provide a wheeled vehicle with runners mounted so as to be swung to a position to cause the wheels to work onto the runners.

A further object of the invention is to provide a novel means of mounting the wheels of the vehicle to better adapt the vehicle to the arrangement of sleigh runners.

The invention also has for its design to provide novel means for swinging the runners from a position on the ground to a raised position to permit the wheels to support the vehicle.

The invention also has for its design to provide a novel running gear frame to support the wheels and runners, and to provide on said frame means for supporting a draft bar, the draft bar being mounted to be slid transversely to locate the thills centrally of the vehicle, or to one side of the center.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation of a combined sleigh and wheeled vehicle constituting one embodiment of my invention; Fig. 2 is a plan view of the running gear frame of the vehicle, with the improved draft bar for the thills; Fig. 3 is a rear end view of the lower portion of the vehicle, with the sleigh runners in position below the wheels, the draft bar and its supporting means being omitted; Fig. 4 is a view similar to Fig. 3, but with the vehicle supported on the wheels thereof and the sleigh runners in a raised position; Fig. 5 is a fragmentary front view of a front wheel, a runner being shown in section; Fig. 6 is a fragmentary detail in side elevation of the front end of a side bar, showing the means for supporting the draft bar at one end; Fig. 7 is a front view of the elements shown in Fig. 6; Fig. 8 is a fragmentary side elevation given to show the details of the means for rocking the runners; Fig. 9 is a cross section on approximately the line 9—9 of Fig. 8; Fig. 10 is a fragmentary front view with parts broken away, of the draft bar and a means for sliding the same; Fig. 11 is a cross section on the line 11—11 of Fig. 10; Fig. 12 is a detail side elevation, with a part broken out, showing the means for supporting the draft bar at the opposite end from that shown in Figs. 6 and 7; and Fig. 13 is a cross sectional view similar to Fig. 9, but illustrating a modification.

In constructing the illustrated practical embodiment of my invention, a suitable wagon body 10 is provided, the front and rear springs 11, 11ª, of which rest respectively on front and rear cross frames 12 and 13 of the running gear, said frames being clamped as hereinafter explained, to tubular side bars 14 supported from the front wheels 15 and rear wheels 16, as hereinafter explained. Within the tubular side bars 14, rods or bars 17 are fitted to rock. The bars 17 carry the sleigh runners 18, the ends 19 of which extend upwardly through holes 20 in the bar 17, and are held by nuts 21. For rocking the runner bars 17 a sleeve or enlargement 22 is provided on each tubular side bar 14, and has arms 23 between which a sector 24 is received and pivotally mounted by a bolt 25, the sector having a shank 26 to receive a lever 26ª, indicated by dotted lines in Figs. 1, 3 and 4, the teeth 27 of the sector meshing with the teeth 29 on a segment 28, which is secured to the bar 17. The arrangement is such that by rocking the lever 26ª, the bar 17 will be rocked to swing the sleigh runners 18 from a position beneath the wheels, as in Fig. 3, to the position shown in Fig. 4, in which said runners are raised, or vice versa. In the rocking of the side bar 17, the movements of the segments 28 are accommodated by a slot 14ª in the side bar 14.

Instead of rocking the bars 17 by the means described, each bar 17ª (Fig. 13) may have a handle 26ᵇ rigid therewith, each side bar 14ᵇ being formed with a slot 14ᶜ to accommodate the movements of the lever.

Each front wheel 15 of the vehicle is a caster wheel, being journaled in a fork 30 having a spindle 31 at its upper end swiveled in a vertical bearing 32, which is secured by a screw 33 to the end 34 of one of the arms 35 of the forward cross frame 12. A set screw 36 may take into the bearing 32, the inner end of the set screw being received in an annular groove 37 of the spindle 31. As seen in Fig. 5, the ends of the arms 35 are shackled to the side bar 14, the said arms constituting one half of the shackle, the latter being completed by an under member 37ª and screws 38. Each end of the arm 39 of the front frame 12 is formed with a half shackle 40 (Figs. 1 and 2) the remaining member 41 being clamped against the under side of the said bar by screws 42, or their equivalent.

The rear cross frame 13 comprises arms 43, the ends of which are formed into shackle members 44, to which are united the forked hangers 45 for each wheel 16. The hangers 45 each comprise two upwardly converging members in the form of forks 46, which are formed at their upper ends with lateral, inwardly-extending shackle members 47, and a bolt 48 or equivalent fastener passes through the inner end of the member 47 and through an arm 43 at the shackle member 44. Each forked arm 46 of each hanger 45 is furthermore formed at the outside with a shackle member 49, between which and a shackle member 50, the outer end 43ª of each arm 43 is clamped by means of set screws 51 or the like.

It will be understood that the means for securing the hangers 45 to the arms 43 and side bars 14 may vary, and also that other means may be employed for swiveling the front wheel forks 30.

In connection with the side bars 14, as described, I employ means for supporting the draft bar 52, to which thills 53 are clamped by any suitable connections 54. Thus a shackle 55 is clamped to the forward end of one side bar 14, and is provided with a forwardly extending bracket 56, to the outer ends of which is secured by shackles or clips 57, a tubular rod or casing 58, in which the draft bar 52 is fitted. At the end of the draft bar opposite the shackle 55, a shackle 55ª is clamped to the forward end of the adjacent side bar 14, and on a forwardly-projecting bracket arm 56ª thereon, a half shackle or yoke 57ª is formed and provided with set screws 57ᵇ or their equivalent, that fasten the yoke to the casing 58.

In order that the draft bar 52 may be slid longitudinally in the rod 58, to shift the thills from the position shown in full lines in Fig. 2 to the position indicated by dotted lines, the thill connections 54 project through slots 58ª, 58ᵇ, in the casing 58, and the draft bar 52 is formed with rack teeth 59, with which meshes the toothed sector 60, fulcrumed as at 61 in a clamp 62 secured to the rod 58, the sector being provided with a shank 63 to which, in practice, a lever 64 (Fig. 1) may be secured. Thus by rocking the lever 64 laterally, the sector 60 will shift the position of the draft bar 52.

Each runner 18 has a vertical lug 18ª at the inner side at the top of the runner, which forms a stop for limiting the outward movement of the runner by contacting with the tire or rim of the wheel. The runners, when thrown downward to a position alongside the wheels and against the latter, will cause the wheels to creep up on the runners.

Having described my invention and given a practical means for carrying the same into effect, I would state in conclusion that I do not limit myself to the mechanical details herein illustrated, since manifestly the same can be considerably varied without departing from the spirit of the invention.

Having thus described my invention, I claim as new and desire to secure by Letters Patent:—

1. A combined sleigh and wheeled vehicle, comprising a body, running gear having tubular side bars, wheels mounted on said tubular side bars, and a bar ranging lengthwise in the said side bars and adapted to rock therein and carrying runners movable to a position beneath the wheels or to a raised position between the wheels.

2. In a combined sleigh and wheeled vehicle, the combination of a running gear having tubular side bars, cross frames secured to said side bars, forks at the ends of said frames outside of the said bars for mounting running wheels, sleigh runners, means for supporting said runners from the side bars at the inner sides of the wheel, and means for rocking said runners.

3. In a combined sleigh and wheeled vehicle, the combination of a running gear frame comprising tubular side bars and front and rear cross frames secured to said side bars, members shackled to said side bars and having bearings for running wheels, a bar ranging longitudinally in each of said tubular side bars, a runner secured at its upper ends to the ends of the last mentioned bar, rack teeth on the runner bar, toothed sectors fulcrumed on the side bars and meshing with the rack teeth on the runner bar, and levers for rocking said sectors.

In testimony whereof I have signed my name to this specification in the presence of two subscribing witnesses.

WILLIAM ELLIS WISE.

Witnesses:
 HARRY E. BILLMAN,
 PHILIP ZEALER.

Copies of this patent may be obtained for five cents each, by addressing the "Commissioner of Patents, Washington, D. C."